United States Patent [19]

McFarland

[11] Patent Number: 4,685,860
[45] Date of Patent: Aug. 11, 1987

[54] APPARATUS FOR LOADING A WHEELCHAIR OR SIMILAR OBJECT

[76] Inventor: Robert E. McFarland, 8301 NW. 39th Expressway, Bethany, Okla. 73008

[21] Appl. No.: 792,874

[22] Filed: Oct. 30, 1985

Related U.S. Application Data

[62] Division of Ser. No. 565,164, Dec. 23, 1983, Pat. No. 4,573,854.

[51] Int. Cl.⁴ .......................... B60R 7/00; B66C 13/22
[52] U.S. Cl. ..................................... 414/720; 267/170; 212/152; 414/462; 414/674; 414/921
[58] Field of Search ............... 414/462, 673, 674, 720, 414/921; 410/3, 4, 51; 267/139, 167, 168, 170, 174, 178, 179; 187/35, 36, 67; 212/86, 132, 152, 222; 293/4, 124, 137

[56] References Cited

U.S. PATENT DOCUMENTS

| | | | |
|---|---|---|---|
| 1,099,429 | 6/1914 | Dargaczewski | 293/137 X |
| 1,297,150 | 3/1919 | Greenleaf | 414/720 X |
| 1,975,094 | 10/1934 | Fitch | 414/674 X |
| 2,529,193 | 11/1950 | Rueter | 212/152 |
| 2,679,405 | 5/1954 | Snyder | 293/137 X |
| 2,919,142 | 12/1959 | Winget | 293/137 X |
| 3,395,813 | 8/1968 | Bruce et al. | 414/719 |
| 3,807,592 | 4/1974 | Lynn et al. | 414/462 |
| 3,853,199 | 12/1974 | Hirashima et al. | 293/4 X |
| 4,015,835 | 4/1977 | Schumacher et al. | 187/67 X |
| 4,019,752 | 4/1977 | Leon et al. | 410/4 X |
| 4,039,096 | 8/1977 | McAllister | 414/462 |
| 4,213,729 | 7/1980 | Cowles et al. | 414/462 |
| 4,236,860 | 12/1980 | Gottlieb et al. | 414/462 |
| 4,273,498 | 6/1981 | Dickhart, III et al. | 414/556 |
| 4,376,611 | 3/1983 | Koop | 414/462 |
| 4,398,858 | 8/1983 | Paffrath | 414/462 |
| 4,420,286 | 12/1983 | Hanson et al. | 414/921 X |

FOREIGN PATENT DOCUMENTS 2383342  3/1977  France ................................ 410/3

Primary Examiner—Leslie J. Paperner
Attorney, Agent, or Firm—Laney, Dougherty, Hessin & Beavers

[57] ABSTRACT

An apparatus for loading a wheelchair or similar object into a vehicle. When in a stored position, the apparatus and wheelchair are fully contained within said vehicle. A first embodiment illustrates use of the apparatus in a rear compartment of a station wagon, van or similar vehicle in which a pair of motor-driven drive links and a pair of drag links are utilized to lift and rotate a chair rack and wheelchair mounted thereon into said vehicle rear compartment. The drive and drag links connect the rack to a carriage which may then be rolled from a rearwardmost to a forwardmost position for final storage of the apparatus and chair in the vehicle. Latching means is provided to latch the carriage in either its forwardmost or rearwardmost positions. A remote control switch and limit switches are used to control power to the electric motor. A second embodiment of the apparatus is designed for use in the trunk of a typical passenger automobile. In this configuration, the chassis has an upper section defining tracks in which a carriage may roll and a lower section attached to the lower surface of the vehicle trunk. Collapsible support means is provided between the upper and lower sections such that the upper section may be lowered toward the lower section during a loading cycle. Crank and lever means are utilized so that, as the chair is lifted and rotated into the rear compartment, the carriage will be rolled from its rearwardmost to its forwardmost position concurrently with the lowering of the upper section. A latch is provided to prevent undesired movement of the carriage when in its rearwardmost loading or unloading position.

10 Claims, 17 Drawing Figures

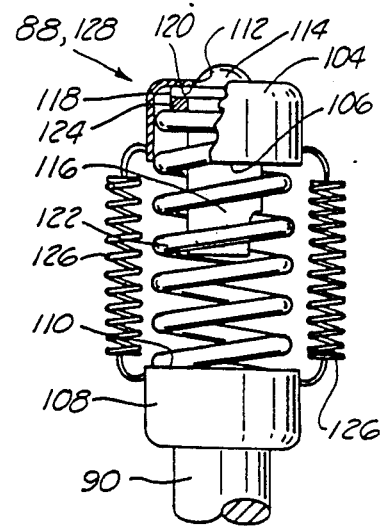
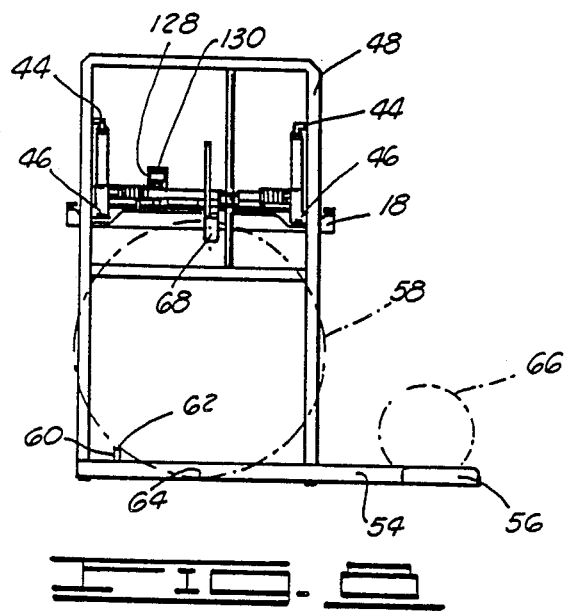
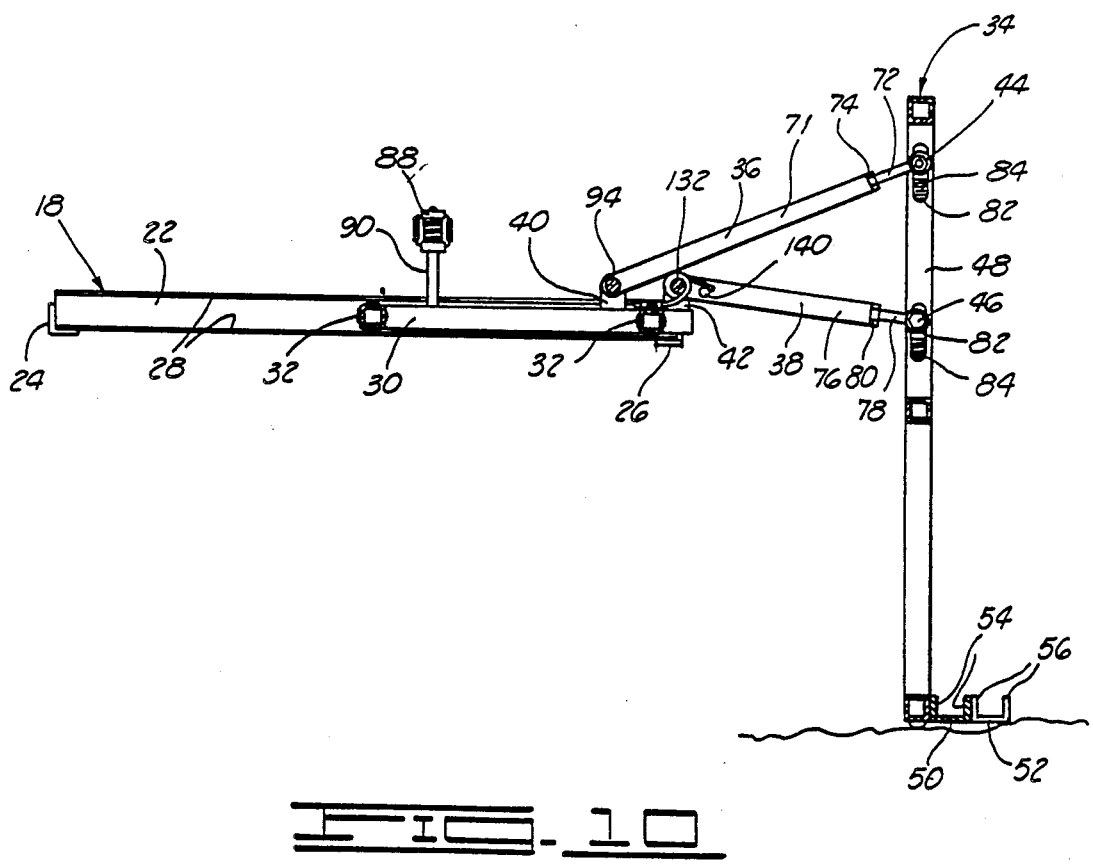

APPARATUS FOR LOADING A WHEELCHAIR OR SIMILAR OBJECT

This is a division of application Ser. No. 565,164, filed Dec. 23, 1983, now U.S. Pat. No. 4,573,854.

BACKGROUND OF THE INVENTION

1. Field of the Invention

This invention relates to apparatus for loading a wheelchair or similar object into a vehicle, and more particularly, to an apparatus having a storage position fully contained within said vehicle.

2. Description of the Prior Art

U.S. Pat. No. 3,622,026 to Tornhelm shows a device for tilting a load from a vertical to a horizontal position onto the flatbed of a truck utilizing two toggle-type linkages which simply rotate the load about a fixed pivot point. This is distinct from the present invention which uses a pair of rigid drive links and another pair of rigid drag links to lift, as well as rotate, the load into a substantially horizontal storage position. Two patents, U.S. Pat. Nos. 3,627,158 to Kobasic and 3,807,592 to Lynn et al., indicate apparatus which could be used for loading a wheelchair by manually tilting and lifting a rack to the level of the rear compartment of a vehicle, and then sliding or rolling the apparatus into the rear compartment. Neither of these loaders uses a linkage or electric motor driven power train as does the present invention. In addition, the Lynn et al. patent requires a roller to be mounted on the rear bumper of the vehicle, and thus the apparatus is not fully contained in the rear compartment. U.S. Pat. Nos. 4,326,860 to Gottlieb et al. and 4,272,218 to Carter describe apparatus for externally loading a wheelchair on the roof of a vehicle, rather than into a limited internal space as does the present invention. U.S. Pat. No. 4,407,624 to Kingston illustrates a wheelchair loading apparatus having a linkage comprised of five pivotal interconnected links to raise a wheelchair into a vehicle. In the Kingston patent, the wheelchair is always maintained in an upright position. The present invention stores the wheelchair in a collapsed, horizontal position, thus permitting it to be stored in a much smaller space than does the apparatus disclosed in the Kingston patent.

SUMMARY OF THE INVENTION

The apparatus for loading a wheelchair or similar object of the present invention is designed to be fully contained within a rear compartment of a vehicle. A first embodiment is designed to load a wheelchair into the rear compartment of a station wagon or similar vehicle, but could also be used at a rear or side opening of a van or similar vehicle. A second embodiment is designed for use in the trunk of a typical passenger automobile.

In the first embodiment, a chassis having a horizontally rolling carriage thereon is mounted to the lower surface of the rear compartment of the vehicle. A chair rack is pivotally connected to the carriage by a pair of drive links and another pair of drag links. Each of these links is adjustable in length. The spacing between the pivotal connections located at the ends of a drive link and the corresponding drag link which are connected to the chair rack is greater than the spacing between the pivotal connections located at the ends of the same drive link and drag link which are connected to the carriage.

The chair rack has a support frame with a pair of rails for one main wheel and front wheel of the wheelchair. The main wheel is rolled against a stop to prevent further movement. A toggle clamp located on an opposite side of the vertical center line of the main wheel is used to prevent rotation of, and exert a downward force on, the wheel. The stop, rail and toggle clamp thus form a three-point pattern to rigidly hold the wheel to the rack. Spring-loaded height adjustment means is provided on the rack to compensate for variations in the height of the lower surface of the rear compartment of the vehicle, and for variations in the surface of the ground.

Once the chair is loaded, it is then collapsed, and the rack and chair are rotated about the drive links with the drag links guiding the rack in the desired path of motion. This rotational motion is completed when the frame of the rack contacts a shock absorber mounted on the carriage. The carriage is then rolled to a forwardmost position so that the door of the rear compartment of the vehicle may be closed. The rotational portion of the loading cycle may be manually performed, but use of a reversible electric motor is preferable. The motor rotates a worm gear which drives a spur gear attached to a shaft interconnecting the two drive links. Thus, power is transferred from the motor to the drive links, rotating the rack and the chair which it carries. The motor is controlled by a cable-mounted or wireless remote control switch which can be temporarily located outside the vehicle. The motor is further controlled by limit switches mounted in at least one of the shock absorbers attached to the carriage. The switch is installed such that the frame of the rack will strike a control button on the switch which stops the motor during a loading cycle. A similar shock absorber-limit switch is utilized to stop the motor during an unloading cycle. This occurs when the control button of the switch is contacted by a switch actuator on the drive shaft.

A pair of torsion springs mounted on a shaft interconnecting the two drag links provide a means for counterbalancing the weight of the rack and chair, thereby reducing the power required by the motor to load or unload the apparatus.

Mounted on the carriage are a forward latch and a rearward latch which will latch the carriage in a storage or loading position, respectively. The forward latch may be disengaged by pulling on a handle mounted on a longitudinal bar attached to the carriage. Further pulling on the handle will then cause the carriage to roll from its forwardmost to its rearwardmost position. Pushing on the handle will disengage the rearward latch, and further forward force will cause the carriage to roll from its rearwardmost to its forwardmost storage position.

A second embodiment of the invention is designed for use in the trunk of a normal passenger automobile in which the trunk has a rear lip extending upwardly from a lower surface. A chassis has a base section attached to the lower surface and an upper section which is substantially parallel to the base section when the apparatus is in the loading or unloading position. The upper section is supported above the base section at its forward end by a pair of rigid vertical members and at the rearward end by a pair of toggle joints. The forward vertical members are pivotally attached to the upper section, and the rear toggle joints are pivotally attached to both the upper and lower sections. The upper section defines a pair of longitudinal internal guide tracks with which a carriage is in guided, rolling contact. A chair rack identical to that in the first embodiment is attached to a rear portion of the carriage by a pair of drive links and a pair of drag links which are also constructed in the manner previously described. Crank and lever means interconnect a center knee of each toggle joint with the carriage and base section of the chassis.

During a typical loading cycle, the chair rack is rotated in a manner similar to the first embodiment. In addition, during this rotation an actuation arm extending from each drive link engages the crank and lever means such that further rotation of the drive links causes the carriage to roll forward and concurrently causes the toggle links to collapse, lowering the rear portion of the upper section toward the lower section of the chassis. When the carriage reaches its forwardmost position, the toggle joints are sufficiently collapsed such that the trunk lid of the vehicle may be closed.

Although this loading cycle may be performed manually, it is again preferable to use a reversible electric motor which drives a worm and spur gear power train similar to that in the first embodiment.

A latch is provided to prevent undesired movement of the carriage when it is in its rearwardmost position. The latch is disengaged by a shoulder on one of the actuation arms attached to the drive links at approximately the same point during the rotational cycle as the actuation arms engage the crank and lever means.

An important object of the present invention is to provide an apparatus for loading and unloading a wheelchair or similar object from a vehicle in which the apparatus and the stored wheelchair may be fully contained within a rear compartment of the vehicle.

Another object of the invention is to provide an apparatus for loading or unloading a wheelchair or similar object by using a reversible electrical motor so that the operation may be carried out by a handicapped person or other person lacking strength.

A further object of the invention is to provide a wheelchair loading apparatus which is adaptable to many different kinds of vehicles and which may be adjusted to compensate for the height of the vehicle rear compartment above the ground and for variations in the ground surface.

Additional objects and advantages of the invention will become apparent as the following detailed description of the preferred embodiments is read in conjunction with the accompanying drawings which illustrate such preferred embodiments.

BRIEF DESCRIPTION OF THE DRAWINGS

FIG. 8 is a rear elevation view of the chair rack of the first embodiment of the loading apparatus, with parts of a wheelchair illustrated in dashed lines.

FIG. 9 is a partial cross-section and elevation view of a shock absorber with a limit switch mounted therein.

FIG. 10 is a section view of the first embodiment in the loading or unloading position which shows a detail of the height adjustment means and counterbalance means for the rack.

DETAILED DESCRIPTION OF THE PREFERRED EMBODIMENTS

Figure 1:
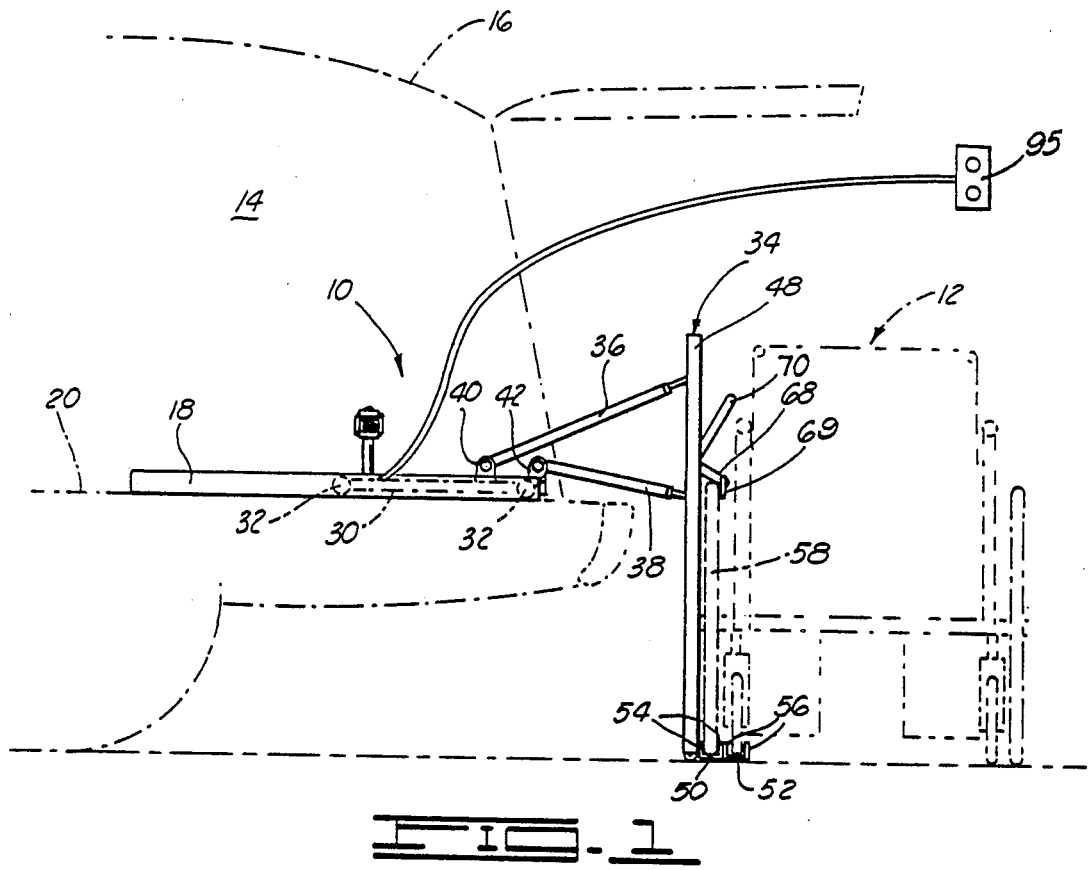
FIG. 1 illustrates the loading or unloading position of the first embodiment of the loading apparatus. A wheelchair is illustrated in dashed lines, and a vehicle is illustrated in broken lines.

Referring now to the drawings, and more particularly to FIGS. 1-4, the first embodiment of the apparatus of the present invention for loading a wheelchair or similar object is generally designated by the numeral 10. This first embodiment is well adapted for loading a wheelchair 12 into the rear compartment 14 of a station wagon 16 or similar vehicle. This embodiment can also be used at a rear or side opening of a van or similar vehicle.

Figure 7:
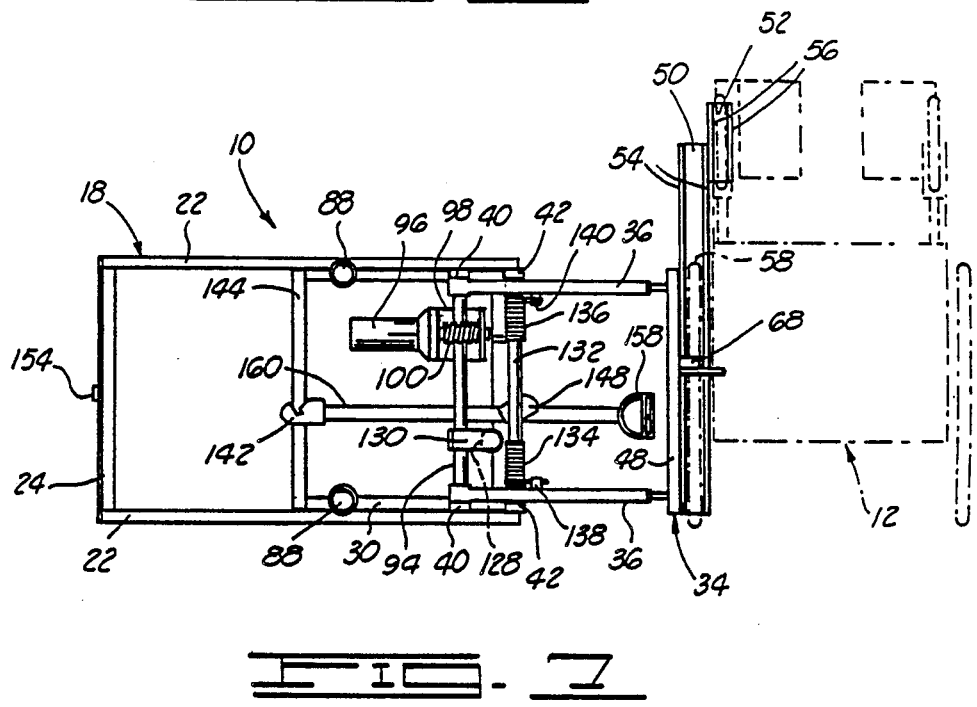
FIG. 7 is a plan view of the first embodiment as shown in a loading or unloading position. A wheelchair is illustrated in dashed lines.

Referring now to FIGS. 1, 7 and 10, the apparatus is shown in a position in which a wheelchair 12 may be loaded or unloaded. A chassis 18 is mounted to lower surface or floor 20 of rear compartment 14 and is formed by a pair of parallel longitudinal members 22, a forward transverse member 24 and a rearward transverse member 26. As best illustrated in FIG. 10, each longitudinal member 22 defines an internal guide track 28. A carriage 30 is mounted on rollers 32 which are in guided, rolling contact with tracks 28 so that the carriage is free to move longitudinally with respect to chassis 18. The chassis 18 and carriage 30 thus form a base portion of the entire apparatus. A chair rack 34 is connected to carriage 30 by a pair of drive links 36 and a pair of drag links 38. The carriage end of each drive link 36 pivotally attaches to carriage 30 at a pivot block 40, and the carriage end of each drag link 38 is similarly attached to the carriage at pivot block 42. The rack end of each drag link 38 is attached to rack 34 at pivotal connection 44, and each drag link 38 is similarly attached to the rack at pivotal connection 46. Pivotal connections 44 and 46 are also shown in FIG. 8. The spacing between rack end pivotal connections 44 and 46 is greater than that between carriage end pivot blocks 40 and 42.

FIGS. 1, 7 and 8 illustrate how wheelchair 12 is loaded onto rack 34. The main structure of rack 34 is a support frame 48 which has a main wheel rail 50 and a front wheel rail 52, attached to the lower end thereof, onto which are rolled the corresponding wheels on one side of wheelchair 12. Vertical guides 54 and 56 keep the wheels properly tracked on rails 50 and 52. Main wheel 58 of wheelchair 12 is rolled onto rail 50 until it stops against stop plate 60 at contact point 62 with the lowermost portion of the wheel resting on rail 50 at contact point 64. Front wheel 66 is concurrently rolled onto rail 52. A toggle clamp 68, which is a self-locking, over-center toggle mechanism, prevents rotation of main wheel 58 by means of a clamp plate 69 which exerts a downward force on an upper surface thereof when in a clamping position. Clamp plate 69 may be alternately moved between a free and clamping position by lever 70. Toggle clamp 68 is on a side of a vertical center line of main wheel 58 opposite contact point 62. Thus, toggle clamp 68 and contact points 62 and 64 form a three-point pattern to rigidly hold the wheel to rack 34 as best illustrated in FIG. 8.

FIG. 10 shows that each drive link 36 has a main portion 71 with a telescoping rod 72 reciprocally mounted therein to provide a length adjusting means. Once the desired length has been selected, rod 72 is locked in place with respect to main portion 71 by means of nut 74. Each drag link 38 has a main portion 76, telescoping rod 78 and nut 80 for similar length adjustment means. These length adjustments allow compensation for variations in vehicles in which the apparatus is mounted. An additional feature of these length adjusting means is that the upper portion of rack 34 may be tilted slightly away from wheelchair 12. With this arrangement, the outboard wheels of the chair are raised from the ground when toggle clamp 68 is moved into place to bear against main wheel 58. This allows the operator to easily collapse the chair for loading into the vehicle.

As also shown in FIG. 10, height adjustment means is provided for rack 34 to compensate for variations in the height of lower surface 20 of rear compartment 14 above the ground, and for variations in the surface of the ground. Pivotal connections 44 and 46 are free to slide in vertical slots 82 in support frame 48. Springs 84 are mounted in support frame 48 bearing on connections 44 and 46 to downwardly bias the frame toward the ground.

Figure 2:
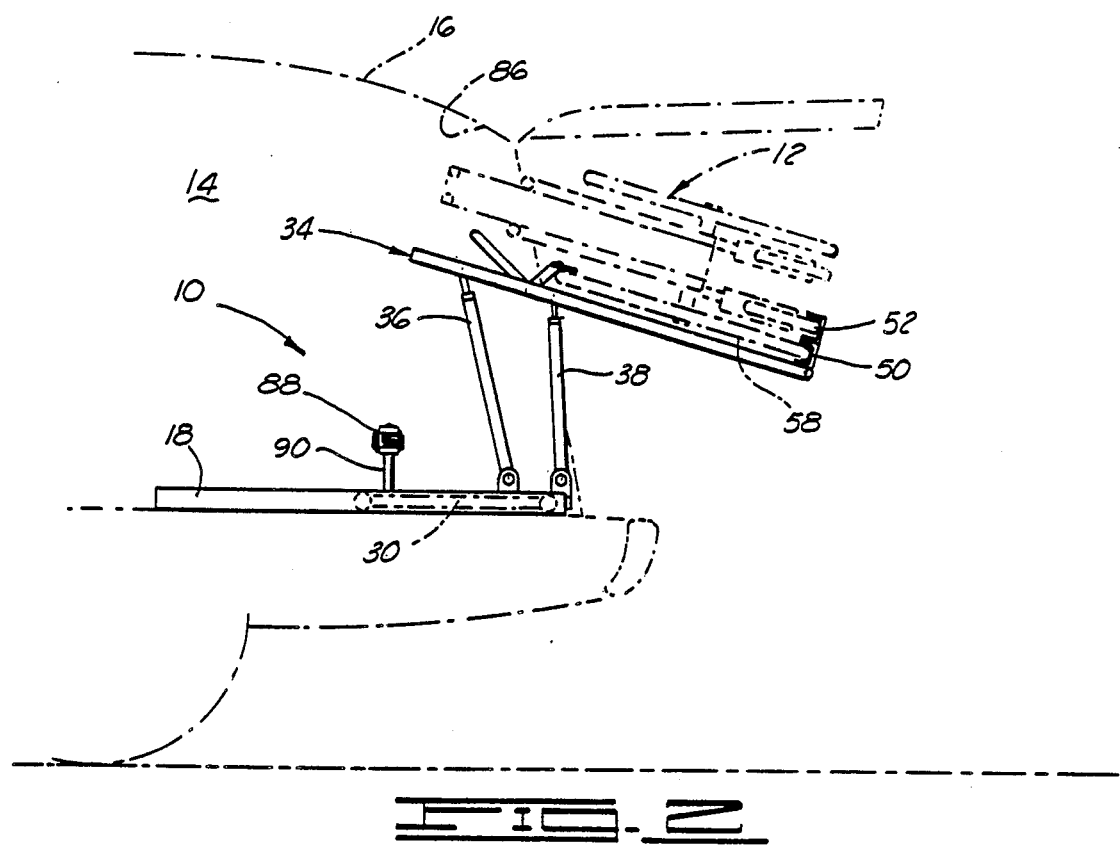
FIG. 2 shows a midway point during a typical loading or unloading cycle of the first embodiment.
Figure 3:
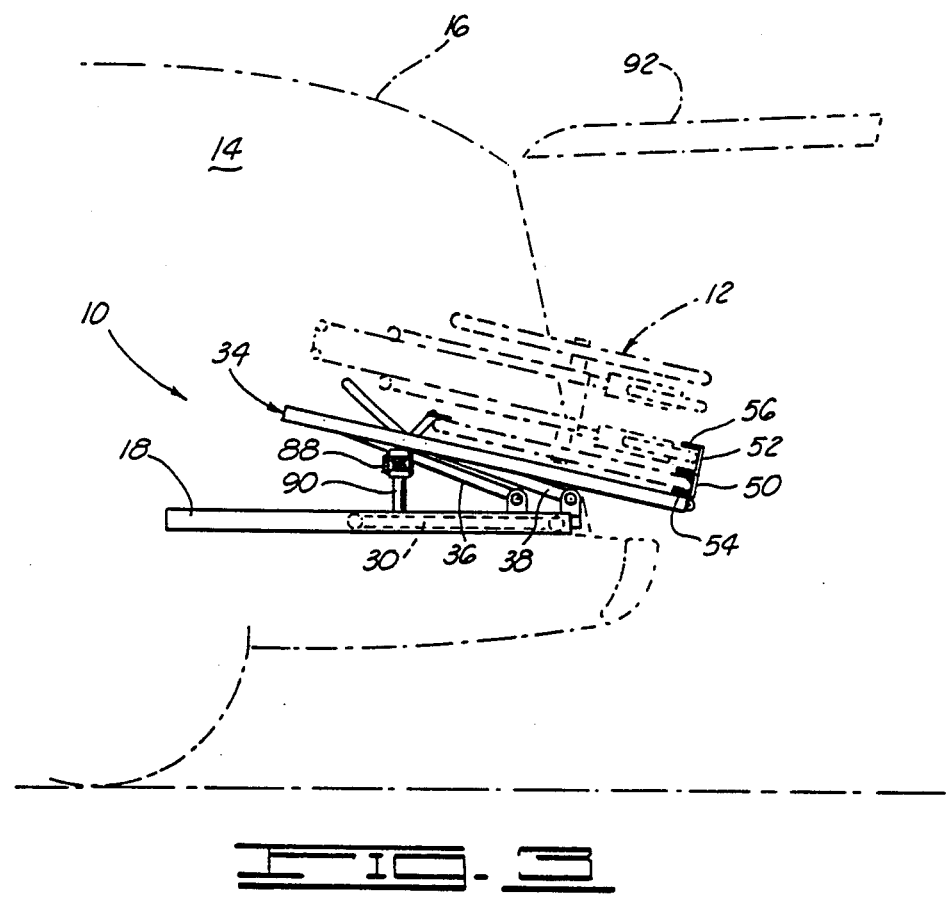
FIG. 3 shows the final rotational position of the chair rack and wheelchair mounted thereon in the first embodiment of the loading apparatus.
Figure 4:
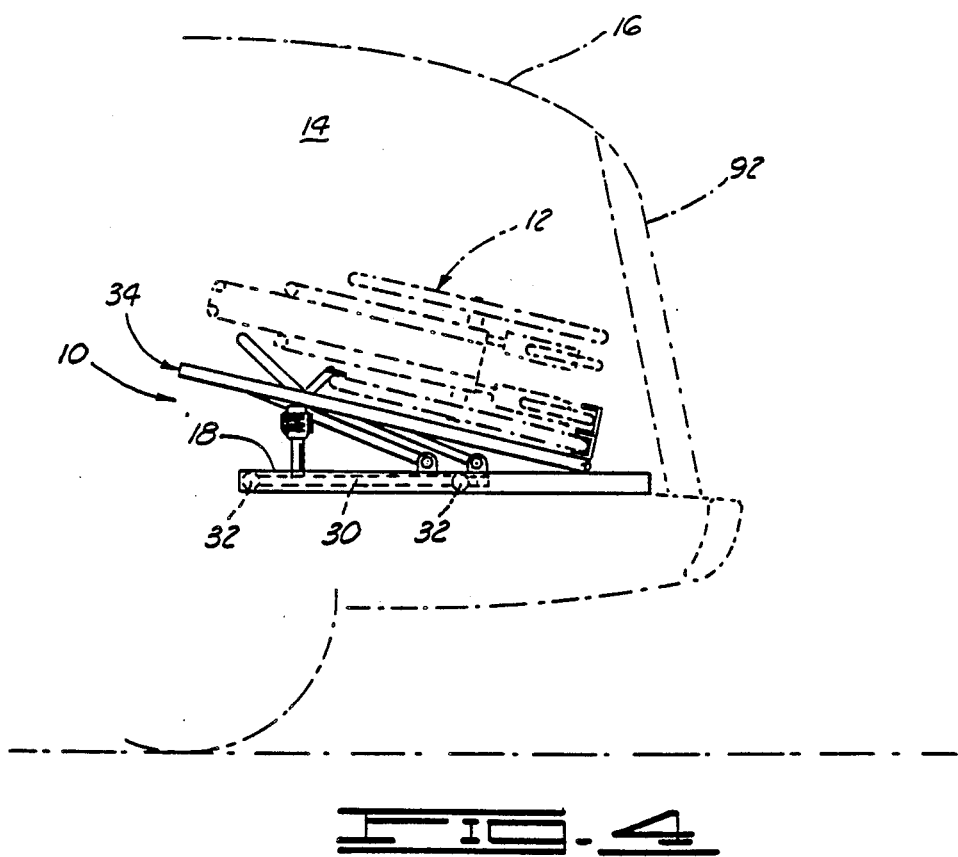
FIG. 4 illustrates the wheelchair (in dashed lines) and rack moved to a forwardmost storage position of the first embodiment in which the door to the rear compartment of the vehicle is closed.

Referring again to FIGS. 1-4, a typical loading operation is illustrated. As previously discussed, the chair is rolled onto rails 50 and 52 and clamped into place by toggle clamp 68 as shown in FIG. 1. The chair is then collapsed, and the rack and chair are rotated about drive links 36. Drag links 38 guide the rack in the desired path of motion. A midway point in this rotational cycle is illustrated in FIG. 2 where it can be seen that the chair has cleared the upper portion 86 of rear compartment 14. This rotation is completed when rack 34 contacts shock absorber 88 which is mounted on post 90 attached to carriage 30 as best illustrated in FIG. 3. Rack 34 and chair 12 attached thereto may then be moved further into rear compartment 14 by rolling carriage 30 to a forwardmost position as shown in FIG. 4. This allows the door 92 of rear compartment 14 to be closed. Thus, the entire apparatus and wheelchair mounted thereon are completely contained within vehicle 16.

Figure 6:
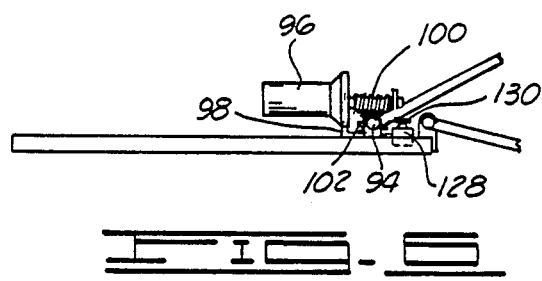
FIG. 6 is an elevation view of the electric motor and drive train used to power the first embodiment of the loading apparatus.

The rotational portion of the loading cycle may be manually performed, but the preferred method is to use a prime mover such as an electric motor and power transmission means. Referring now to FIGS. 6 and 7, it will be seen that a drive shaft 94 interconnects the two drive links 36 between pivot blocks 40. Drive shaft 94 is fixedly attached to drive links 36 such that the drive links will be rotated as the shaft is rotated. A reversible electric motor 96 is mounted to carriage 30 by means of a bracket 98. Motor 96 drives a worm gear 100 which engages spur gear 102 fixed to drive shaft 94. Thus, electric motor 96 can be used to rotate shaft 94 and drive links 36 to raise and rotate rack 34 and chair 12 mounted thereon from the loading position shown in FIG. 1 to the storage position shown in FIG. 3. The carriage is then manually rolled to its forwardmost position shown in FIG. 4 as previously described. Although a worm and spur gear are illustrated for the purposes of this disclosure, alternate means of power transmission could be used. For example, but not by way of limitation, a multiple spur gear drive or a chain drive would also be suitable.

A cable mounted or wireless remote control switch 95, illustrated in FIG. 1, can be temporarily located outside of the vehicle to control the motor during operation. Motor 96 is alternately reversed to perform an unloading operation.

A limit switch is integrally mounted in at least one shock absorber 88 to stop motor 96 when rack 34 reaches the storage position shown in FIG. 3. This structure is shown in detail in FIG. 9. Shock absorber 88 is formed by an upper substantially cylindrical retainer cap 104 having a downwardly opening end 106 and a lower substantially cylindrical retainer cap 108 having an upwardly open end 110. Upper retainer cap 104 has an opening 112 in the upper portion thereof through which extends a pressure sensitive control button 114 of limit switch 116. A flange portion 118 of switch 116 bears against upper inside surface 120 of retainer cap 104. A shock absorbing spring 122 is placed between retainer caps 104 and 108 extending into open ends 106 and 110, respectively. A spacer ring 124 is located between spring 122 and flange portion 118 of limit switch 116. The assembly is held together by a plurality of retainer springs 126 which bias retainer caps 104 and 108 toward one another. Switch 116 is actuated and stops motor 96 when frame 48 of rack 34 contacts control button 114.

Referring now to FIGS. 6-9, a similar shock absorber 128 with an integral limit switch is illustrated. A switch actuator 130 is rigidly mounted to drive shaft 94, and is positioed such that it will contact the pressure sensitive control button in the limit switch mounted in shock absorber 128 when the apparatus is moved to the loading or unloading position shown in FIG. 1, thus stopping motor 96.

Referring again to FIGS. 7 and 10, a shaft 132 interconnects the carriage end of drag links 38 between pivot blocks 42. Torsion springs 134 and 136 are mounted at opposite ends of shaft 132. When the apparatus is in the loading position, torsion spring 134 bears against carriage 30 and pin 138 on adjacent drag link 36 to cause a torque tending to rotate the link from the loading position to the storage position. Similarly, when the apparatus is in the storage position, torsion spring 136 bears against carriage 30 and pin 140 on the respective drag link causing a torque which tends to rotate the link from the storage position to the loading position. Thus, torsion springs 134 and 136 provide a means for counterbalancing the weight of rack 34 and chair 12 which reduces the power required by motor 96 to move the apparatus.

Figure 5:
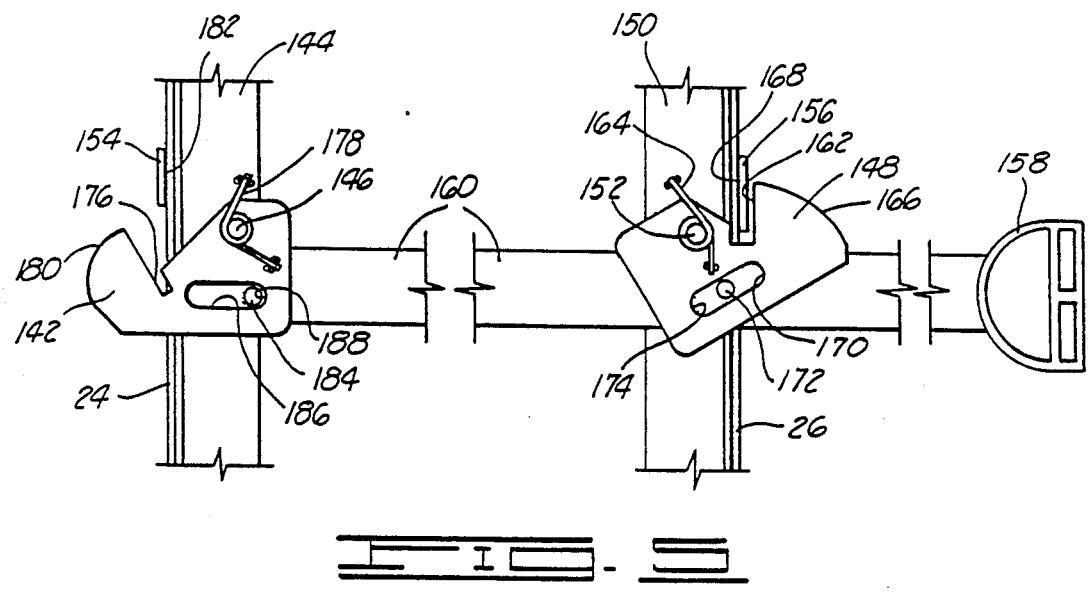
FIG. 5 is a detailed plan view of the latching means of the first embodiment of the loading apparatus.

In FIGS. 5 and 7 a latching means is illustrated which allows carriage 30 to be alternately latched in a rearwardmost or forwardmost wardmost position to prevent undesired movement of the carriage during the rotational loading or unloading cycles, and also while the vehicle is in motion with the apparatus in its fully stored position shown in FIG. 4.

The latching means includes a forward latch 142 pivotally mounted on forward transverse member 144 of carriage 30 by pivot pin 146, and a rearward latch 148 pivotally attached to rearward transverse member 150 of carriage 30 by means of pivot pin 152. A forward latch plate 154 extends vertically from forward transverse member 24 of chassis 18, and a similar rearward latch plate 156 extends vertically from rearward transverse member 26 of chassis 18. The carriage is moved, and the latches are actuated, by pushing or pulling handle 158 which is attached to a longitudinally movable bar 160.

Rearward latch 148 defines a notch 162 which engages latch plate 156, and a torsion spring 164 biases the latch towards the latch plate (counterclockwise as shown in FIG. 5). As carriage 30 is moved from a forwardmost to a rearwardmost position, a curved surface 166 on latch 148 strikes the forward side 168 of latch plate 156 which causes the latch to rotate about pivot pin 152 (clockwise in FIG. 5). Once curved surface 166 clears latch plate 156, spring 164 will cause latch 148 to snap into place with notch 62 engaging latch plate 156. This engaged position of latch 148 is illustrated in FIG. 5. Rearward latch 148 also has a cam slot 170 therein. A cam pin 172 attached to longitudinal bar 160 extends into cam slot 170. By pushing on handle 158, cam pin 172 will bear on forward inner surface 174 of cam slot 170 which causes latch 148 to rotate (clockwise in FIG. 5) and disengage from latch plate 156. Further forward force applied to handle 158 will then cause carriage 30 to roll forward.

Forward latch 142 defines a notch 176. A torsion spring 178 causes latch 142 to rotate (clockwise in FIG. 5) such that notch 176 engages forward latch plate 154. As carriage 30 is rolled to its forwardmost position, curved surface 180 of latch 142 will strike the rear side 182 of latch plate 154 which causes the latch to rotate about pivot pin 146 (counterclockwise in FIG. 5). After curved surface 180 clears latch plate 154, torsion spring 178 will cause the latch to move to an engaged position. A cam pin 184 attached to longitudinal bar 160 extends into cam slot 186 in latch 142. When forward latch 142 is engaged, a rearward force on handle 158 will cause pin 184 to bear against the rearward inner surface 188 of cam slot 186, causing latch 142 to rotate (counterclockwise in FIG. 5) thus disengaging the latch from latch pin 154. FIG. 5 shows the forward latch in the disengaged position. Further rearward force on handle 158 will cause carriage 30 to roll in a rearward direction. Thus, when the carriage is in its rearwardmost latched position, pushing on handle 158 will disengage the rearward latch and allow the carriage to be moved to a forward latched position. Similarly, pulling on the same handle will disengage the forward latch and allow the carriage to be moved to its rearwardmost latched position.

Figure 11:
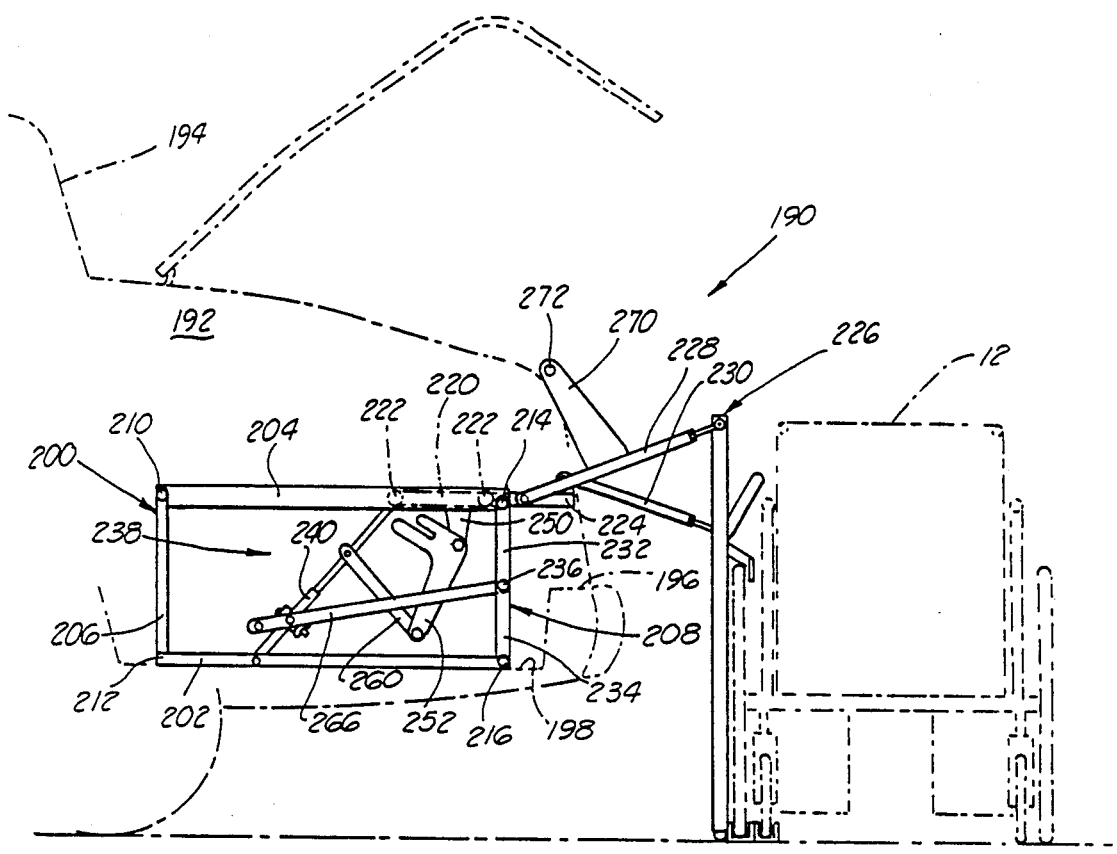
FIG. 11 illustrates the second embodiment of the loading apparatus in a loading or unloading position. A wheelchair is illustrated in dashed lines, and a vehicle is shown in broken lines.

Referring now to FIGS. 11-7, a second embodiment of the invention is shown and generally designated by the numeral 190. The second embodiment is designed for use in the rear compartment or trunk 192 of a normal passenger automobile 194 in which the trunk typically has a rear lip 196 which extends upwardly from a lower surface 198. The trunk also typically affords less clearance than in a station wagon. A chassis 200 has a base section 202 attached to lower surface 198, thus forming a base plate for the entire apparatus, and an upper section 204 which is substantially parallel to base section 202 when the apparatus is in the loading or unloading position shown in FIG. 11. Upper section 204 is supported above base section 202 at the forward end by a pair of rigid vertical members 206 and at the rearward end by a pair of toggle joints 208. Each vertical member 206 is pivotally attached to upper section 204 at pivot point 210 and forms a rigid connection 212 with lower section 202. Each toggle joint 208 is pivotally attached to upper section 204 at point 214 and pivotally attached to lower section 202 at point 216.

Figure 15:
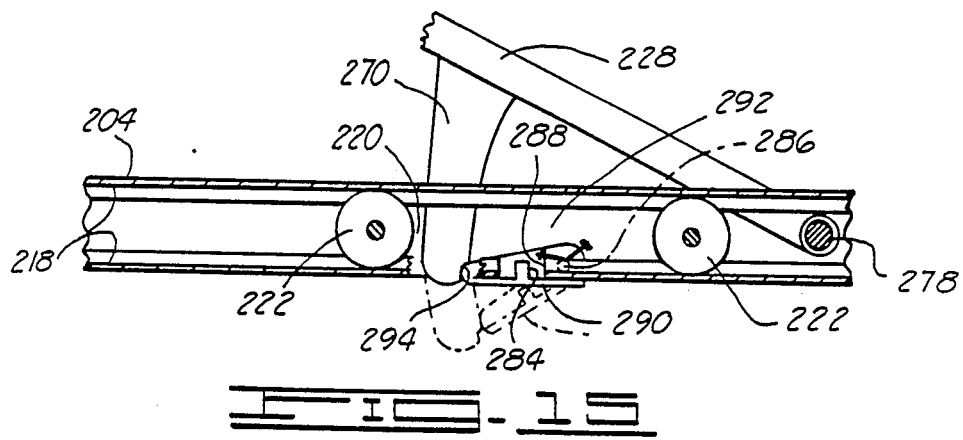
FIG. 15 is a detailed view of the carriage latch used in the second embodiment of the loading apparatus.
Figure 16:
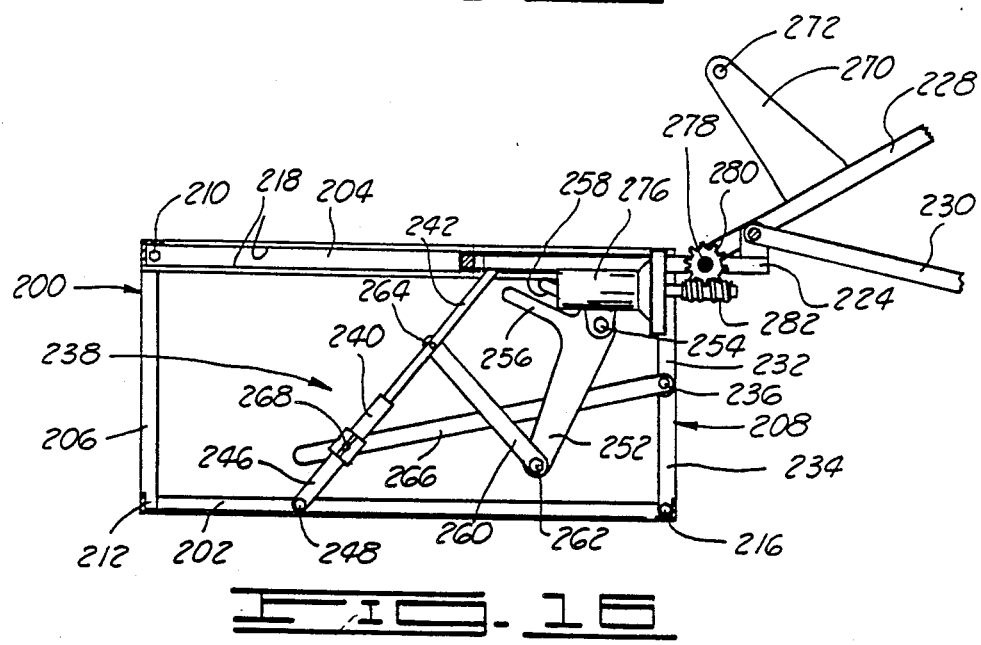
FIG. 16 is a partial cross-section of the second embodiment taken along lines 16—16 in FIG. 17 showing details of the electrical motor driven gear train and the crank and lever means.
Figure 17:
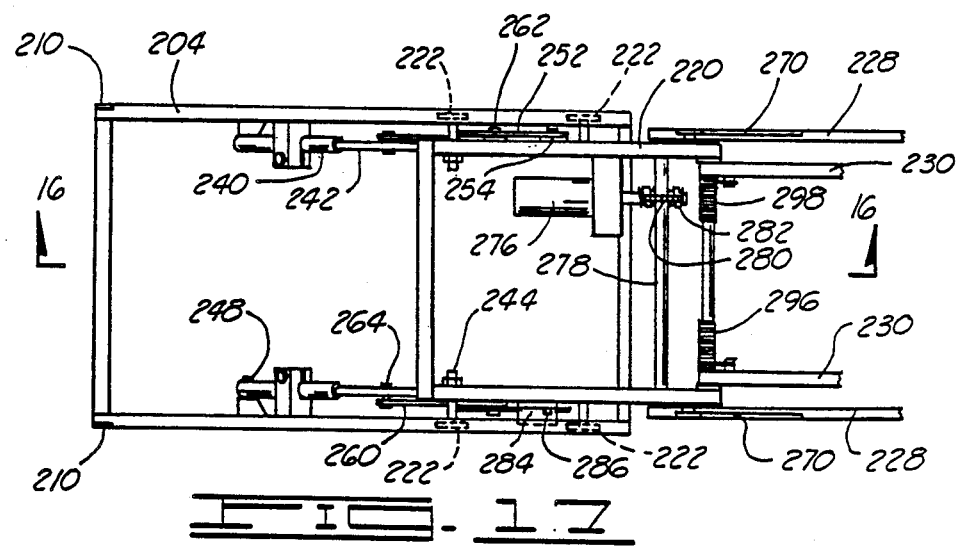
FIG. 17 is a partial plan view of the second embodiment of the loading apparatus.

As best shown in FIGS. 15 and 16, upper section 204 defines longitudinal internal guide tracks 218. A carriage 220 is mounted on rollers 222 which are in guided, rolling contact with guide tracks 218. When in the loading or unloading position shown in FIGS. 11 and 16, a rear portion 224 of carriage 220 extends beyond upper section 204 toward the rear of the vehicle. A chair rack 226, identical to chair rack 34 included in the first embodiment of the invention, is attached to rear portion 224 of carriage 220 by a pair of drive links 228 and a pair of drag links 230 which are constructed in the manner previously described.

Each toggle joint 208 has an upper toggle link 232 and a lower toggle link 234 pivotally joined at a center knee 236 to form collapsible support means for upper section 204. Crank and lever means, generally designated by the numeral 238, interconnects center knee 236 with carriage 220 and base section 202 of chassis 200. Specifically, a pair of telescoping, sliding cranks 240 each has an upper end 242 pivotally connected to the forward end of carriage 220 at point 244 and a lower end portion 246 pivotally connected to base section 202 at point 248. Upper end 242 reciprocally slides within lower end 246 so that, as carriage 220 rolls from a rearwardmost to a forwardmost position, the length of each sliding crank 240 is adjusted accordingly. A pair of pivot blocks 250 are attached to carriage 220 and extend downwardly therefrom. A bell crank 252 is pivotally attached to each pivot block 250 at an apex 254. A first end 256 of each bell crank 252 has a slot 258 therein. A connecting rod 260 pivotally connects a second end 262 of one bell crank 252 to an intermediate point 264 on upper end 242 of a corresponding sliding crank 240. A toggle lever 266 pivotally connects center knee 236 of a toggle joint 208 to an intermediate point 268 on lower end 246 of the respective sliding crank 240. Actuation means in the form of an actuation arm 270 is fixedly attached to each drive link 228. A drive pin 272 extends from both actuation arms 270 for engagement with slot 258 in corresponding bell crank 252 in a manner hereinafter described.

Figure 12:
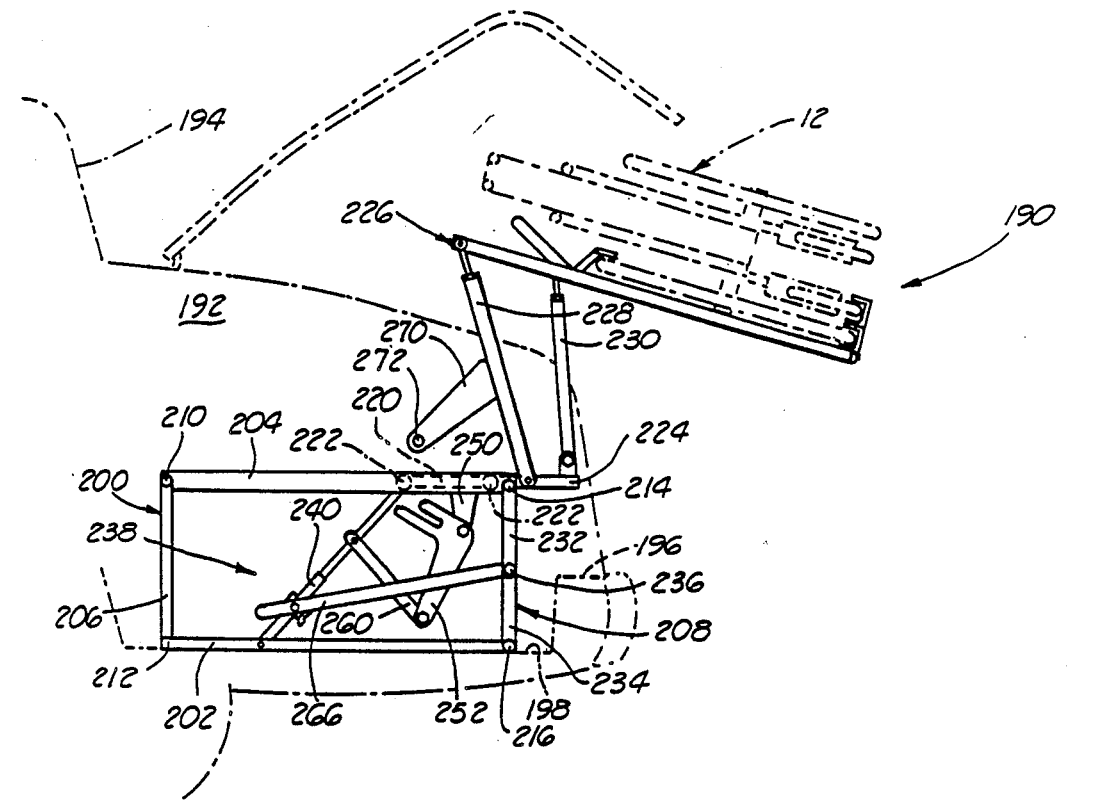
FIG. 12 shows an intermediate point during a typical loading cycle in the second embodiment of the loading apparatus.
Figure 13:
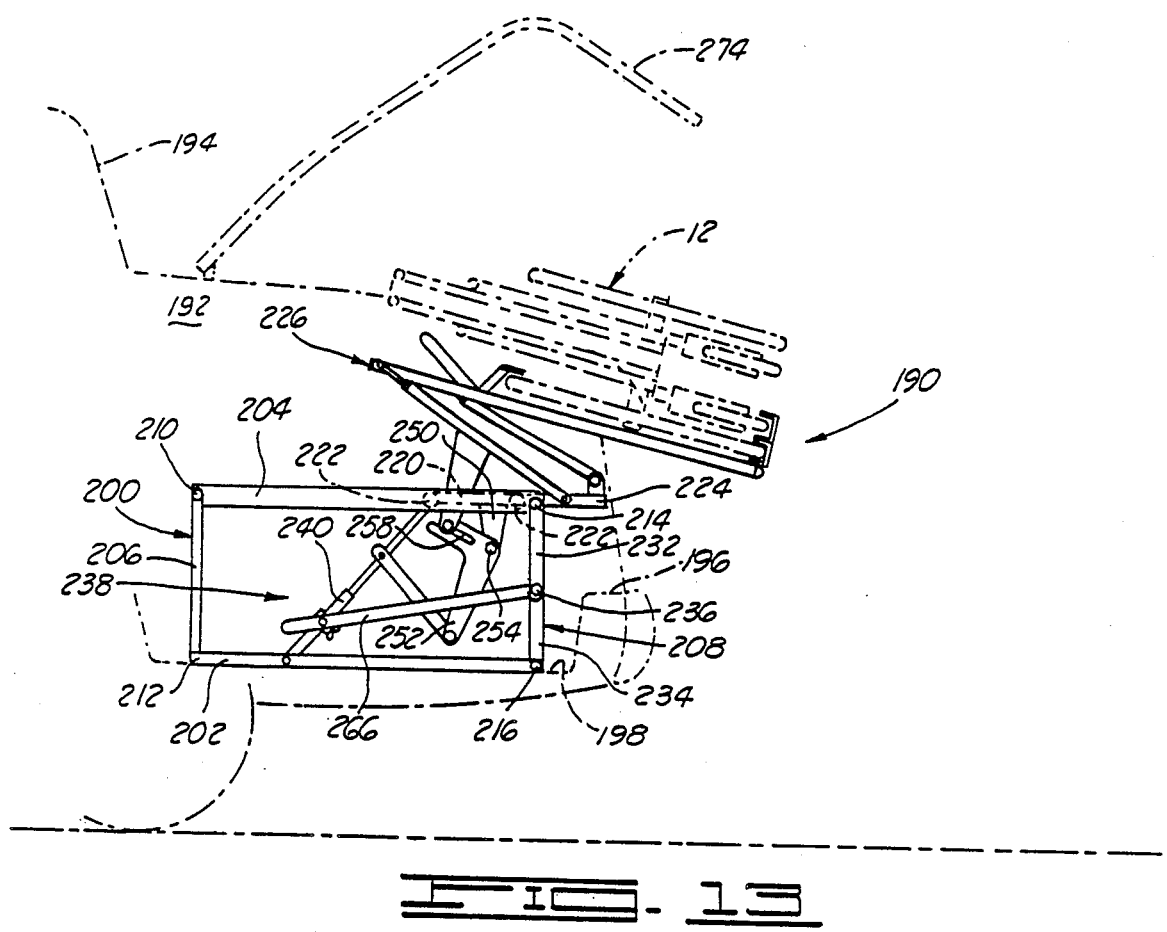
FIG. 13 shows the second embodiment in a further intermediate positio during a loading cycle.
Figure 14:
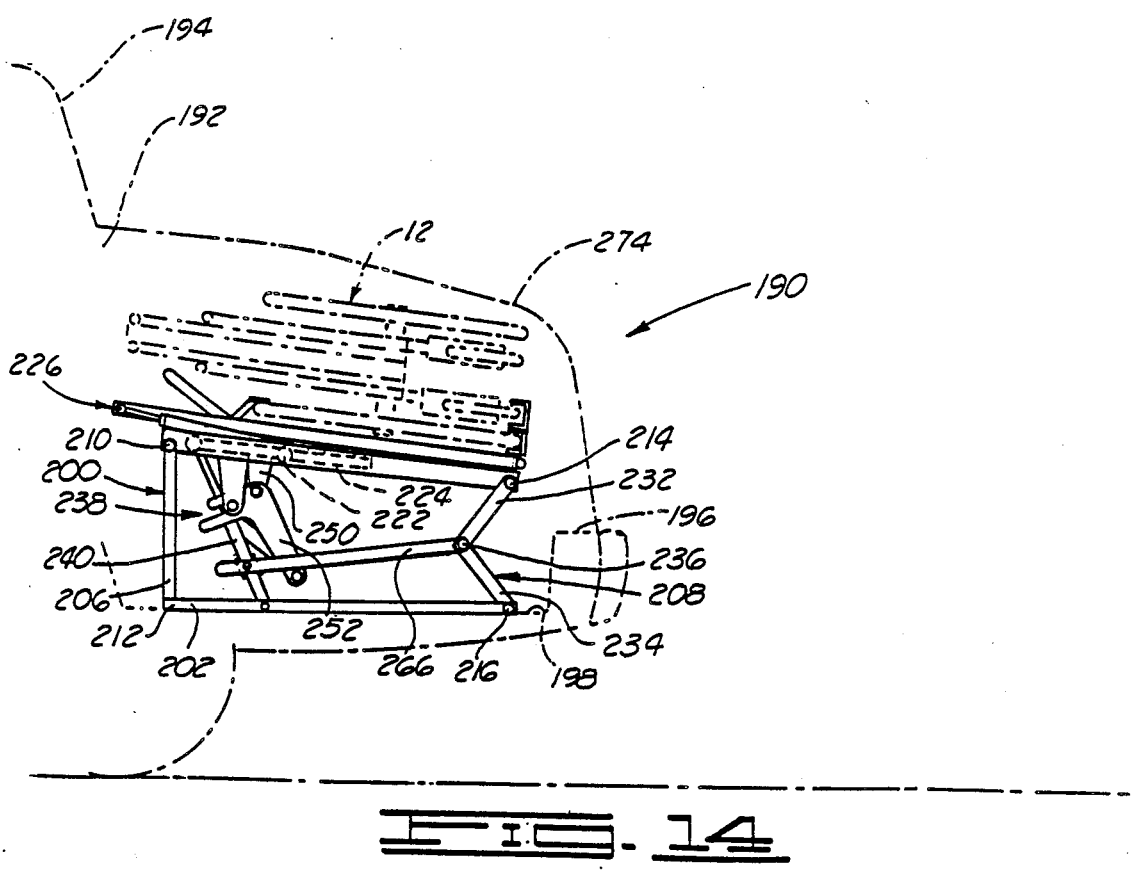
FIG. 14 illustrates the second embodiment in a fully stored position in which the trunk lid of the vehicle is closed.

Referring again to FIGS. 11-14, a typical loading cycle is described. In FIG. 11, the apparatus is shown in a loading or unloading position. Wheelchair 12 is rolled onto rack 226 and clamped thereto in a manner identical to that discussed in the first embodiment. The chair is collapsed and the rack is rotated in an upward and forward motion as illustrated in the intermediate position in FIG. 12. As rotation continues, drive pin 272 on actuation arm 270 engages slot 258 in the adjacent bell crank 252 as best shown in FIG. 13. Further rotation of drive link 228 causes the bell cranks to rotate (counterclockwise as shown in the illustrations). This rotating motion causes apex 254 of each bell crank 252 to be drawn forward toward sliding cranks 240, thus rolling carriage 220 forward from its rearwardmost position. Concurrently therewith, sliding cranks 240 are also rotated forward (counterclockwise in the illustrations). Also concurrently, toggle levers 266 are pulled forward, and this motion actuates each toggle lever 208 by moving center knees 236 forward. As a result, the rear end of upper section 204 is lowered toward lower section 202. As shown in the storage position illustrated in FIG. 14, carriage 220 eventually reaches a forwardmost position at which point toggle joints 208 have collapsed sufficiently such that trunk lid 274 may be closed. Thus, the entire apparatus and stored chair are fully contained within the vehicle.

Although this loading cycle can be performed manually, it is preferable to use a reversible electric motor 276 as shown in FIG. 16. A drive shaft 278 interconnects drive links 228 and has a spur gear 280 fixedly mounted thereon. Motor 276 drives worm gear 282 which meshes with spur gear 280 thus providing rotational motion to drive link 228 and rack 226. Control of electric motor 276 is obtained in a similar manner as that of motor 96 in the first embodiment. Although not illustrated in the drawings showing the second embodiment, it should be understood that limit switches, such as that in FIG. 9, may be mounted on the second embodiment to stop the motor when the apparatus reaches a desired point.

At least one latch 284 is provided to prevent undesired movement of carriage 220 when in its rearwardmost position. As illustrated in FIG. 15, latch 284 is pivotally attached to carriage 220 by pivot pin 286. Upper section 204 has a hole 288 in the lower portion thereof and latch 284 has a corresponding tab 290. A torsion spring 292 biases latch 284 toward upper section 204 so that tab 290 will engage hole 288. This engaged position is shown in solid lines in FIG. 15. As drive links 228 rotate forward during a loading cycle, a shoulder 294 on at least one actuation arm 270 contacts latch 284, acting as unlatching means to disengage tab 290 from hole 288 as shown in phantom lines in FIG. 15. Alternately, during an unloading cycle, as drive links 228 are rotated rearwardly, shoulder 294 on actuation arm 270 moves upwardly away from latch 284, thus allowing tab 290 to engage hole 288 in upper section 204 upwardly to prevent further movement of carriage 220. The crank and lever means 238 and collapsed toggle joints 208 prevent undesired movement of the apparatus when in the stored position of FIG. 14.

Torsion springs 296 and 298 act as a means for counterbalancing in a manner identical to springs 134 and 136 in the first embodiment of the invention.

It can be seen, therefore, that the wheelchair loading apparatus of the present invention is well adapted to carry out the objects and obtain the ends and advantages mentioned, as well as those inherent therein. While two presently preferred embodiments of the invention have been described for the purposes of this disclosure, numerous changes in the construction and arrangement of parts can be made by those skilled in the art. All such changes are encompassed within the scope and spirit of this invention as defined by the appended claims.

What is claimed is:

1. A limit switch for stopping an object moved by electrical power delivered thereto by an electrical circuit, said limit switch comprising:
   shock-absorbing means having an opening in one end thereof; and
   an electrical switch adapted for connection in said electrical circuit mounted in said opening, said switch having a pressure sensitive control button extending therefrom, out of said opening, said electrical switch and shock-absorbing means cooperating so that said button is movable independently of said shock-absorbing means and is positioned to be contacted by said moving object at least as soon as said shock-absorbing means is contacted thereby, and said electrical switch is effective to open the electrical circuit to interrupt electrical power at a time immediately prior to, or simultaneously with, contact of the moving object with said shock-absorbing means to arrest the momentum of said moving object;
   wherein, said shock-absorbing means comprises:
   a first substantially cylindrical retainer cap having an open end;
   a second substantially cylindrical retainer cap having an open end, said one end of said shock-absorbing means being an end of said second cap spaced from said open end thereof, and said opening being a central opening in said one end, said switch being disposed in said second cap and said control button extending through said central opening opposite said open end;
   a coil spring having a first end disposed in said open end of said first cap and a second end disposed in said open end of said second cap, and bearing against said switch, whereby said spring absorbs the impact of a moving object striking said second cap and said button; and
   holding means for holding said caps, switch and spring together.

2. The apparatus of claim 1 further comprising a spacer ring disposed in said second cap between said switch and said second end of said spring.

3. The apparatus of claim 1 wherein said holding means is characterized by a plurality of retainer springs, each having a first end attached to said first cap and a second end attached to said second cap, said retainer springs being in tension to bias said caps toward one another.

4. The apparatus of claim 1 wherein said spring and switch are substantially concentric.

5. A limit switch for stopping an object moved by electrical power delivered thereto by an electrical circuit, said limit switch comprising:
   a first retainer cap having an open end;
   a second retainer cap having an open end and defining an opening in an end spaced from said open end;
   an electrical switch disposed in said second cap and having an independently movable pressure sensitive control button thereon extending through said opening, said switch being adapted for connection in said electrical circuit;

a spring having a first end disposed in said open end of said first cap and a second end disposed in said open end of said second cap; and holding means for holding said first and second caps, switch and spring together;

wherein, said first and second caps, switch and spring cooperate so that said button is contacted by said moving object at least as soon as said second cap is contacted thereby, said spring absorbing the impact of said moving object striking said second cap and said button, so that electrical switch opens sand electrical circuit to interrupt electrical power at a time immediately prior to, or simultaneously with, contact of said moving object with said second cap for arresting momentum of said moving object.

6. The limit switch of claim 5 further comprising a spacer disposed in said second cap between said switch and said second end of said spring.

7. The limit switch of claim 5 wherein said holding means is characterized by a plurality of retainer springs, each of said retainer springs having a first end attached to said first cap and a second end attached to said second cap, said retainer rings being in tension for biasing said caps toward one another.

8. The limit switch of claim 5 wherein said spring and switch are substantially concentric.

9. The limit switch of claim 5 wherein said first and second caps are substantially cylindrical in configuration.

10. The limit switch of claim 5 wherein said first and second caps are spaced apart.

* * * * *

UNITED STATES PATENT AND TRADEMARK OFFICE
CERTIFICATE OF CORRECTION

PATENT NO. : 4,685,860
DATED : August 11, 1987
INVENTOR(S) : Robert E. McFarland It is certified that error appears in the above-identified patent and that said Letters Patent are hereby corrected as shown below:

Column 1, line 33, delete "4,326,860" and insert --4,236,860--.
Column 4, line 24, delete "positio" and insert --position--
Column 6, line 55, delete "positioed" and insert --positioned--.
Column 7, line 10, delete "wardmost"; line 36, delete "G2" and insert --162--.
Column 8, line 3, delete "11-7" and insert --11-17--.
Claim 5, line 23, delete "sand" and insert --said--.

Signed and Sealed this

Twenty-second Day of December, 1987

Attest:

DONALD J. QUIGG

Attesting Officer

Commissioner of Patents and Trademarks